United States Patent [19]
Templeton et al.

[11] 3,828,854
[45] Aug. 13, 1974

[54] DISSOLVING SILICEOUS MATERIALS WITH SELF-ACIDIFYING LIQUID

[75] Inventors: Charles C. Templeton; Evan H. Street, Jr.; Edwin A. Richardson, all of Houston, Tex.

[73] Assignee: Shell Oil Company, Houston, Tex.

[22] Filed: Oct. 30, 1973

[21] Appl. No.: 411,132

Related U.S. Application Data

[63] Continuation-in-part of Ser. No. 351,739, April 16, 1973, abandoned.

[52] U.S. Cl. .................................. 166/307, 166/278
[51] Int. Cl. ............................................. E21b 43/27
[58] Field of Search ............ 166/307, 271, 270, 300, 166/278; 252/8.55 C

[56] References Cited
UNITED STATES PATENTS

| | | |
|---|---|---|
| 2,059,459 | 11/1936 | Hund et al. ..................... 166/307 X |
| 2,118,386 | 5/1938 | Swinehart .................... 166/307 UX |
| 2,652,360 | 9/1953 | Bond et al. .......................... 166/307 |
| 2,664,398 | 12/1953 | Bond................................ 166/307 X |
| 2,804,145 | 8/1957 | Holbrook........................ 166/307 X |
| 3,157,232 | 11/1964 | Ramos et al. .................... 166/307 X |
| 3,297,090 | 1/1967 | Dilgren ........................... 166/307 X |
| 3,307,630 | 3/1967 | Dilgren et al. .................. 166/307 X |
| 3,508,613 | 4/1970 | Huff et al............................ 166/307 |
| 3,707,192 | 12/1972 | Goins, Jr. et al. ............... 166/307 X |

*Primary Examiner*—Stephen J. Novosad
*Attorney, Agent, or Firm*—Howard W. Coryell

[57] ABSTRACT

Siliceous materials in or around a well are dissolved by contacting them with a self-acidifying aqueous liquid system comprising an aqueous solution of at least one water-soluble fluoride salt mixed with a relatively slowly-reactive acid-yielding material that subsequently converts the salt solution to a hydrofluoric acid solution that has a relatively high pH but is capable of dissolving siliceous material.

20 Claims, 2 Drawing Figures

DISSOLVING SILICEOUS MATERIALS WITH SELF-ACIDIFYING LIQUID

RELATED PATENT APPLICATION

This application is a continuation-in-part of U.S. Pat. application Ser. No. 351,739, filed Apr. 16, 1973, now abandoned; the disclosures of which are incorporated herein by reference.

BACKGROUND OF THE INVENTION

The invention relates to a process, such as a well treating process, for dissolving siliceous materials, such as permeability-impairing particles of sand or clay in or around a well borehole. More particularly, the invention relates to dissolving such materials with a solution which can be flowed into contact with the siliceous material before the solution becomes strongly acidic and which can dissolve the siliceous material while maintaining a relatively high pH.

Numerous procedures for treating wells with siliceous-material-dissolving hydrofluoric acid solutions (commonly called "mud acid" solutions) have been previously proposed. For example, in U.S. Pat. No. 1,990,969 solutions of hydrochloric acid and water-soluble fluoride salts are used to avoid the surface handling of a hydrofluoric acid solution. In U.S. Pat. No. 2,001,579 the corrosivity of a solution of hydrochloric and hydrofluoric acids is reduced by incorporating a corrosion inhibitor. In U.S. Pat. No. 2,050,931 a water-wetting agent is injected ahead of an aqueous solution of hydrochloric and hydrofluoric acids that may be formed by reacting an aqueous solution or suspension of a fluoride salt with an emulsion in which the dispersed phase is an aqueous solution of hydrochloric acid. In U.S. Pat. No. 2,367,350 a slug of hydrochloric is injected ahead of a slug of hydrofluoric acid to remove multivalent cations from the region containing the siliceous material to be dissolved. In U.S. Pat. No. 2,663,689, boric acid is dissolved in an aqueous hydrochloric-hydrofluoric acid solution to avoid precipitation of insoluble fluoride salts, when multivalent cations are encountered, or precipitation of gelatinous hydrofluorosilicic acid, when the acidity of the solution is depleted.

U.S. Pat. No. 3,157,232 describes a well acidation process in which corrosion problems are avoided by forming the acid at the well site from non-corrosive chemicals. Formaldehyde is reacted with an ammonium salt of an acid (such as hydrochloric acid) to form the acid and the acid salt of hexamethylenetetramine. The R. E. Dilgren and R. E. Dilgren and F. M. Newman U.S. Pat. Nos. 3,215,199; 3,297,090 and 3,307,630 describe well acidization processes in which hydrolyzable organic halides are reacted in situ to form aqueous solutions of a hydrogen halide (such as hydrochloric acid). U.S. Pat. No. 3,630,285 describes a process for acidizing a reservoir having a temperature of at least 200° F by injecting a water-soluble ester of an organic carboxylic acid that forms a water-soluble calcium salt. Such reactions might be used to form aqueous solutions containing hydrofluoric acid. However, the processes described in those patents were not proposed as "mud-acidization" processes for dissolving siliceous materials. Prior teachings and beliefs indicate that, in dissolving a siliceous material, an excess of a strong acid (such as hydrochloric acid) must be mixed with hydrofluoric acid in order to prevent the precipitation of insoluble or gelatinous salts of silicic or hydrofluorosilicic acids (e.g., see U.S. Pat. No. 1,990,969).

SUMMARY OF THE INVENTION

The present invention relates to a process for dissolving siliceous material in a remote location, such as a region in or around the borehole of a well, into which a fluid can be flowed. The invention provides a self-acidifying aqueous liquid system comprising an aqueous solution of a water-soluble fluoride salt mixed with a relatively slowly reactive acid-yielding material that subsequently converts the fluoride salt solution to a hydrofluoric acid solution that has a relatively high pH, of at least about 2, but is capable of dissolving siliceous material.

The present self-acidifying aqueous liquid system preferably comprises (a) a substantially homogeneous solution or emulsion in which each increment contains both a fluoride salt and the acid-yielding material and is adapted to penetrate into the pores of a subterranean reservoir and (b) contains proportions of such components adapted to provide an aqueous solution of hydrofluoric acid that contains from about 0.2 to 5 percent by weight of hydrofluoric acid.

In a particularly preferred embodiment, the fluoride salt is an ammonium salt of hydrofluoric acid, the acid-yielding material is a formic acid ester, and the proportions of those components are adjusted to subsequently provide an aqueous mixture of hydrofluoric and formic acids that is adapted to dissolve siliceous material while maintaining a pH above about 4.

DESCRIPTION OF THE DRAWING

The drawing (FIGS. 1 and 2) is a plot of the pH with time and the amount of clay dissolved with time of a self-acidifying liquid solution of ammonium fluoride and methyl formate.

DESCRIPTION OF THE INVENTION

Figure 1:
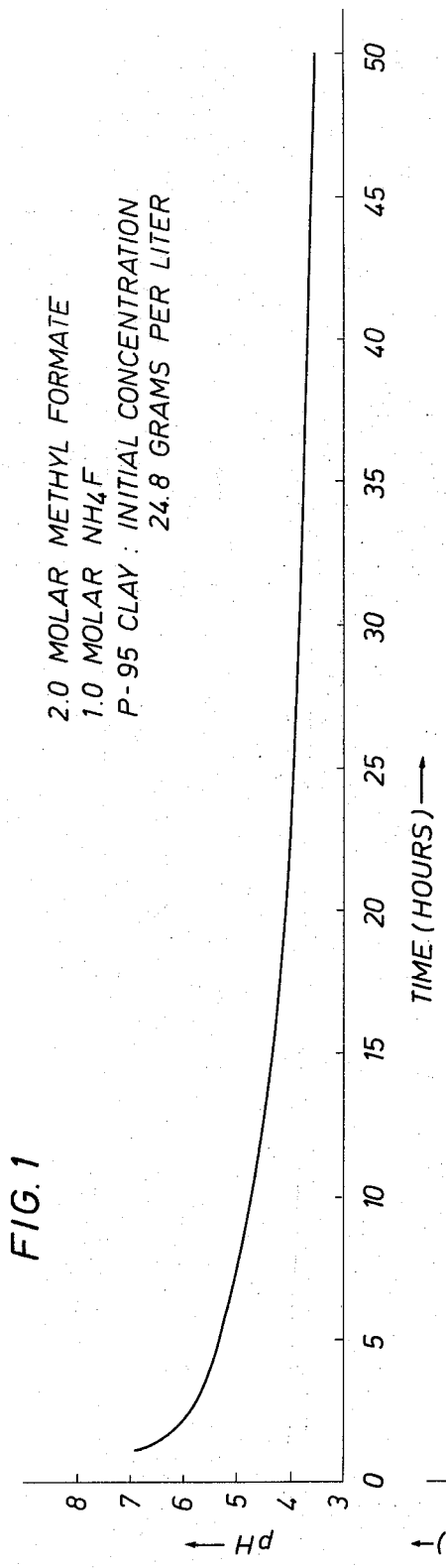
Figure 2:
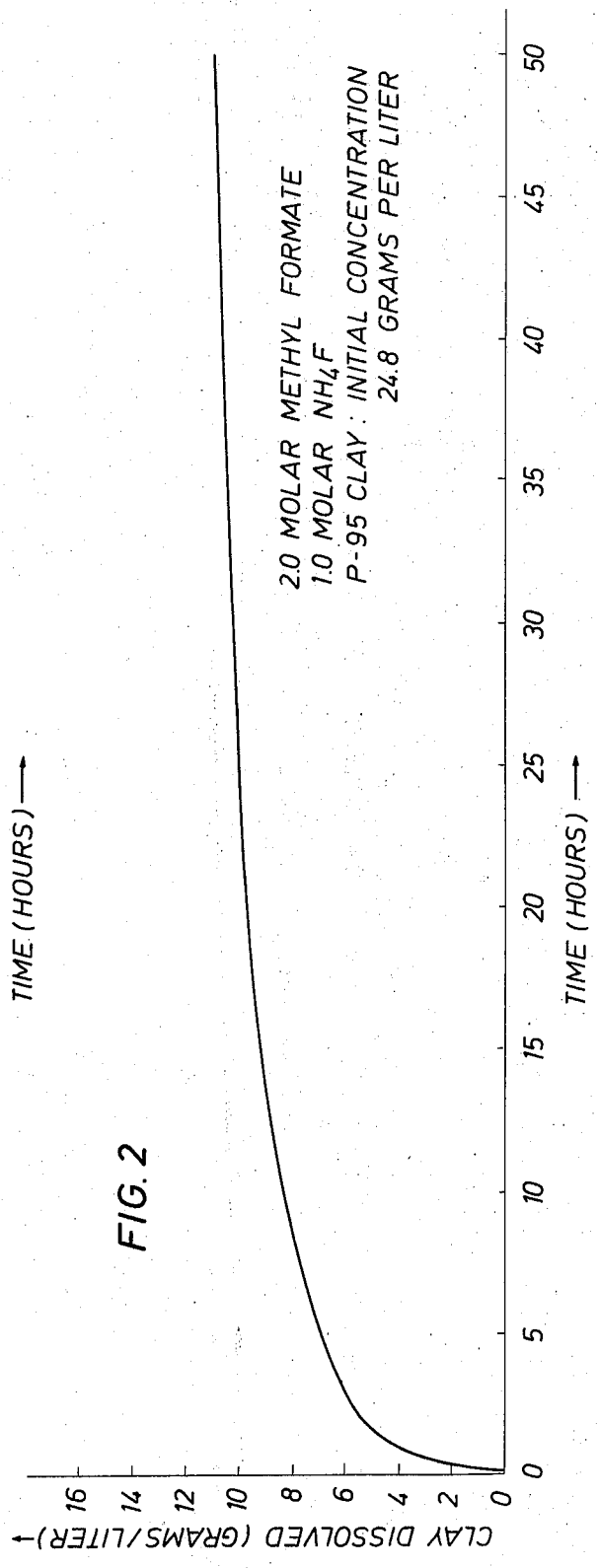

The present invention is, at least in part, premised on a discovery that, in the present self-acidifying aqueous liquid system, as long as the fluoride salt is present in the aqueous solution (so that substantially each molecule of acid yielded by the acid-yielding reactant is utilized in releasing a molecule of hydrogen fluoride from the fluoride salt), the pH of the aqueous solution tends to remain at least above about 2, although the solution soon becomes a hydrofluoric acid solution that is capable of dissolving siliceous materials such as clay. The fluoride salt remains in the aqueous solution until a stoichiometric equivalent amount of acid has been formed by the acid-yielding reactant. Unobviously, where the rate of that acid formation is relatively low, the pH of the aqueous solution remains high throughout the dissolving of a significant amount of clay (even where the acid formed by the acid-yielding reactant is a strong acid, such as hydrochloric acid, and the acid-yielding reactant is present in a significant stoichiometric excess relative to the amount of fluoride salt).

As known to those skilled in the art, an aqueous solution pH as high as 2 is equivalent to a very weakly acidic solution—such as one containing less than about 0.04 percent by weight of hydrogen chloride. The present dissolution of silica is, therefore, contra to the prior teachings and beliefs that a hydrofluoric acid-containing solution would not be effective unless it contains a strong acid (such as hydrochloric acid) and has a very low pH, of less than about 1. Unobviously, the present relatively high pH liquid systems are adapted to cause the silica dissolution to proceed at a rate that increases while the pH of the silica-dissolving solution is decreasing from a substantially neutral value of near 7 to a very weakly acidic value that exceeds 4.

The present relatively high pH "mud acidizing" compositions can be used where the strength and reactivity of a conventional mud acid might be a disadvantage. For example, the present compositions are relatively slowly reactive with cement and can be injected through perforation tunnels in a well casing and the adjacent cement in a portion of a well (e.g., near a gas cap or water zone) where a conventional mud acid could not be used without creating a high risk of opening channels (e.g., acidized passageways through or behind the cement) into a zone with which communication is not desired. Similarly, the present compositions are relatively slowly reactive with metals, resins, silicates or deposited metal oxides. Such relatively acid-sensitive materials are often used as: well conduits; bonding agents for sand or gravel packs in or around a well; clay-fines-immobilizing materials in a subterranean reservoir; or the like. The present compositions can advantageously be used where it is desirable to flow a mud-acidizing system through substantially any acid-sensitive strructure or region. At the most commonly encountered reservoir temperatures, the reactive components of the present compositions and the rates at which they are injected can be adjusted so that the compositions are substantially neutral at the time they are flowed through an acid-sensitive structure or region.

The present invention is particularly useful for treating a well to improve effective permeability by dissolving siliceous materials. Those materials may comprise fine particles of sand and/or clay and/or siliceous intergrannular cementing material in and around: the pores of a subterranean reservoir; a sand or gravel pack in the borehole of the well; fractures that communicate with the well; or the like. However, the invention can also be used to dissolve siliceous material deposits from boiler tubes, heat exchangers, water treaters, or the like types of equipment, wherever a fluid can be flowed into contact with a siliceous material to be dissolved. In perforating a well casing, the present self-acidifying liquid system can be adjusted to remain substantially neutral for an adequate time, positioned in or near the portion of the casing to be perforated, and displaced after the perforations have been formed. In forming a sand or gravel pack in or around a well borehole or in a fracture, the present self-acidifying liquid can be thickened with a viscosity increasing material and used as a carrier liquid for transporting the sand or gravel and/or can be injected behind a slug of such a sand or gravel slurry to be subsequently displaced through the sand or gravel pack and into the reservoir.

The aqueous liquid used in forming the present self-acidifying liquid system can comprise substantially any relatively soft, brackish, fresh, or pure water. Multivalent cations tend to precipitate fluoride ions and increasing concentrations of dissolved salt tend to decrease the solubility of siliceous materials in a hydrofluoric acid-containing solution. Because of this, a soft water that is at least as pure as fresh water is preferred. However, chelating or sequestering agents, such as ethylenediamine tetraacetic acid, etc., can be used to mitigate the effects of multivalent cations.

The present self-acidifying liquid systems can comprise substantially any relatively homogeneous liquid system, inclusive of solutions, emulsions and/or suspensions, as long as each increment of such a system tends to contain the reactive components that yield the specified relatively high pH solution of hydrofluoric acid. For injection into a relatively tight reservoir, the system should be a solution or an emulsion in which the dispersed phase is readily deformable. In certain situations, the reaction rate-reducing effect of having some or all of one of the reactants in a separate phase, such as a dispersed liquid phase and/or a suspended solid phase, can be utilized to delay the time at which the acids are formed. In general, the aqueous solution of a water soluble fluoride salt that is converted to a hydrofluoric acid solution by the reactive components of the present system should develop a pH that decreases with time and becomes relatively stable, for a selected time, at a value between about 2 to 6 (and preferably of between about 3 to 5).

The water-soluble fluoride salt used in the present process can comprise one or more of substantially any fluoride salt that is relatively water soluble. In various operations such as sand or gravel packing operations in which it is not necessary to inject the self-acidifying liquid into relatively fine pores (such as those in a relatively tight reservoir) portions of undissolved fluoride salt can be suspended in the liquid system. The ammonium salts of hydrofluoric acid, i.e., ammonium fluoride and ammonium bifluoride, are preferred fluoride salts for use in the present process. As known to those skilled in the art, in using ammonium bifluoride, ($NH_4HF_2$) it may be desirable to add enough ammonia or ammonium hydroxide to provide substantially equimolar amounts of ammonium and fluoride ions. Alternatively, an excess or deficiency of ammonia or other alkaline material can be used to increase or decrease the initial pH of the self-acidifying liquid system where a relatively short or long delay is desirable with respect to the production of the acidic solution. In addition, a substantially neutral and/or relatively high pH system can be buffered to remain at a selected pH for a selected time and temperature exposure. In such delay-imparting procedures it may be desirable to increase or decrease the proportion of the acid-forming ester or other reactant by an amount equivalent to that used up or not needed in neutralizing the excess of or deficiency of alkalinity.

The organic acid ester or other acid-yielding material used in the present invention can comprise one or more of substantially any water-reactive ester (e.g., hydrolyzable at moderate temperatures, such as about 100° to 300° F) of a relatively weak acid such as a water-soluble carboxylic acid. Examples of suitable esters include the lower aliphatic alcohol (e.g. $C_{1-5}$) esters of the lower fatty acids ($C_{1-5}$) such as those ranging from methyl formate through amyl valerate; the similar alcohol esters of hydroxy acedic acid, oxalic acid and the like substituted and/or polybasic acids; etc. Examples of other suitable acid-yielding materials include hydrolyzable organic halides of the type described in the Dilgren and Newman U.S. Pat. Nos. 3,215,199, 3,297,090 and 3,307,630, such as the normal or isopropyl chlorides, tertiary-butyl chloride, allyl chloride, crotyl chloride, etc.; hydrolyzable acyl halides, such as benzoyl chloride; hydrolyzable acid anhydrides, such as acetic anhydride; phosphoric acid esters, such as dimethyl hydrogen phosphate; hydrolyzable sulphonic acid esters, such as methyl benzene sulphonate; and the like. The water-soluble alcohol esters of water-soluble aliphatic carboxylic acids having dissociation constants of from about $10^{-2}$ (oxalic) to $10^{-6}$ (butyric) are preferred. Halogen-containing materials should not be used in situations in which halogenated organic materials might become dissolved in or entrained in produced crude oil that will be sent to a refinery.

The concentrations of the fluoride salt and water-reactive organic acid ester (or other acid-yielding reactant) in the present self-acidifying liquid systems can vary relatively widely. It is generally desirable that, due to the interaction of the components, the system become at least about 0.1 molar (and preferably from about 1–2 molar) with respect to hydrofluoric acid. As known to those skilled in the art, to some extent, the amount of siliceous material that will be dissolved can be increased by increasing the concentration of hydrofluoric acid; but in numerous situations, it may be preferable to contact the material to be dissolved with more of a relatively dilute solution. The ratio of the acid-yielding material to the fluoride salt should be at least about 1.0 (in moles), in order to release all of the available hydrofluoric acid. Ratios of from about 1.5 to 2.5 are preferred. In general a suitable self-acidifying liquid system of the present type can be readilty recognized by its capability of dissolving a clay such as bentonite (sodium montmorillonite) after time has been allowed for its components to react with each other.

It is important to ensure that the concentration of hydrofluoric acid in the acidic liquid formed by the present self-acidifying liquid system be kept below about 5 percent by weight during any period in which the maintenance of a relatively high pH is desired. In such a range of concentrations hydrofluoric acid behaves as a weak acid. As known to those skilled in the art, such a concentration maintenance can be effected by correlating the concentrations of the system components in relation to the way the system is to be utilized. For example, in a liquid system that contains 1 mole of ammonium fluoride and 2 moles of allyl chloride (which hydrolyzes to yield 2 moles of hydrochloric acid), during the hydrolysis of the first mole of allyl chloride, the solution pH drops from about 7 to about 4 (the pH of a 1 molar, or about 2 percent by weight, hydrofluoric acid solution). During that time, if some or all of the hydrofluoric acid reacts with acid-reactive materials, such as clay, the pH tends to increase or to remain nearer to 7. However, if no acid-reactive materials are contacted by the solution, during the hydrolysis of the second mole of allyl chloride, the pH falls as the aqueous solution becomes a hydrochloric acid solution of increasing concentration. In the latter situation, the pH tends to become less than about 2 when about 1.1 moles of the allyl chloride have been hydrolyzed.

In general, the present self-acidifying liquid system component concentrations should be correlated with the time and temperature to which the system is to be exposed prior to or during the contacting of acid-reactive materials, so that the concentration of hydrofluoric acid in the self-acidifying liquid tends to remain at less than about 5 percent by weight as long as that liquid is disposed within a region within which it is desired to maintain a relatvely high pH, for example (while that liquid is being displaced through the perforation holes in the cement surrounding a perforated section of well casing).

It is generally preferable that the region containing the siliceous material to be dissolved in accordance with the present invention be freed of multivalent cations. This can be accomplished by displacing a slug of hydrochloric acid into that region prior to the inflowing of the present self-acidifying liquid system. Alternatively, or additionally, the multivalent ion tolerance of the present systems can be increased by incorporating in them lower molecular weight glycol ethers that tend to increase the water-wetness of undissolved fine and /or precipitated materials. The mono-ethers of the ethylene glycol, such as the monobutyl-ethers, are effective and can be incorporated in the present systems as such or can be esterified and used as an organic acid ester, such as the formate of the monobutyl ether or ethylene glycol.

The adjustment of the composition of the present self-acidifying liquid system and the rate at which it is flowed (e.g., in order to ensure that a siliceous material to be dissolved is contacted by the system while hydrofluoric and organic acids are present in the system) can utilize procedures and techniques known to those skilled in the art. For example, at a given temperature the hydrolysis rate of an organic acid ester can be made slower by adjusting the system composition to include: a higher molecular weight ester; an ester having a tendency towards steric hinderence; an ester having a lower degree of water-solubility; a relatively high solution viscosity (e.g., imparted by a viscosity increasing material in the aqueous liquid system); or the like. And, analogous adjustments can be made relative to other acid-yielding materials. In addition, adjustments can be made in the rate of flow into a subterranean reservoir, as long as the injection pressure is kept low enough to avoid fracturing or otherwise damaging the reservoir. In sandpacking or gravel packing treatments, the self-acidifying liquid system can be positioned in or near the bottom of a well and kept static for a time long enough for the acidic liquid to be formed.

Siliceous materials can be dissolved by the hydrofluoric of the present self-acidifying liquid while that acid is being formed as well as being dissolved by that acid after it has been formed. Therefore, it is only necessary to ensure that the liquid system is, or will be, in contact with the siliceous materials to be dissolved while the hydrofluoric acid is being formed, or after some or all of it has been formed.

LABORATORY TESTS 1 – 5

Test 1 exemplified the dissolving action of a self-acidifying liquid system at 40° F. The tested solution was an aqueous 1.0 molar ammonium fluoride and 2.0 molar methyl formate solution. An excess of P–95 clay (a hydrochloric acid washed sodium bentonite clay which contains various trace minerals) was suspended in the mixture. Small aliquot proportions were periodically pipetted from the system and analyzed for pH and amount of clay dissolved. The results are plotted in the drawing.

It should be noted that, although the increase in acidity, the reduction in pH, and dissolution of clay, continued at significant rates throughout a ten hour period, the pH was initially near 7 and soon became stabilized at a value of about 4. The amount of clay dissolved levelled out at about 11.0 grams per liter, after about 50 hours. The dissolved amount of clay is approximately 70 percent of the stoichiometric equivalent of the amount of hydrofluoric acid produced by the tested liquid system.

In view of the prior art teachings and beliefs, it is unobvious (a) that such an amount of siliceous material could be dissolved by such a weakly acid system (b) that the dissolving could be accomplished during the self-generation of hydrofluoric acid while it was being formed on an equimolar basis with the self-generation of the formic acid and (c) that the methyl formate could be hydrolyzed at such a relatively rapid rate at such a relatively low temperature.

Tests 2-5 compare the clay-dissolving properties of aqueous solutions of ammonium fluoride and hydrochloric acid. Excess amounts of equivalent bentonite clays were suspended in the solutions; which were periodically sampled, substantially as described above. The results are listed in Table 1.

dissolved was dissolved in the first 2 minutes. In the test 3 system, much of the dissolving occurred in the first 2 minutes and the maximum pH attained was 1.5. In test 4, even in the relatively very dilute solution (1/10 molar in ammonium chloride and hydrochloric acid) the maximum pH attained was less than 2 (throughout a 25 hour period) and the amount of clay dissolved was only 2.5 grams per liter. The test 5 solution (containing a 10 to 1 excess of ammonium fluoride) attained high pH levels but dissolved very little more clay than that dissolved by the test 4 solution.

The measuring procedures used were not responsive to reprecipitated solids, except for a lowering of the apparent level of clay solution by any reprecipitated solids that may have been present, particularly in test 4 and 5.

Test 6 is a rather detailed study of a system of the present type at 70° C (158° F). Samples of an 0.94 molar ammonium fluoride and a 1.85 molar methyl formate solution were mixed with an excess of bentonite clay, sealed in teflon bottles, brought to a reaction Table 1

CLAY SOLUTION BEHAVIOR OF AQUEOUS SOLUTIONS OF $NH_4F$ AND HCl
(Excess of Bentonite at 50°C)

| TEST | Composition of Initial Acid | Elapsed Time (Hours) | Clay Dissolved (gm/liter) | $SiO_2$ in Solution (gm/liter) | pH |
|---|---|---|---|---|---|
| 2 | 1.0M $NH_4F$ | 0.03* | 8.9 | 5.85 | ≤1.0 |
|   | 2.0M HCl | 0.5 | 18.1 | 7.8 | ≤1.0 |
|   |   | 1.0 | 19.2 | 7.9 | ≤1.0 |
|   |   | 2.0 | 20.1 | 8.4 | ≤1.0 |
|   |   | 3.0 | 20.6 | 8.6 | ≤1.0 |
|   |   | 24.5 | 21.3 | 8.4 | ≤1.0 |
|   |   | 96.0 | 21.2 | 9.4 | ≤1.0 |
| 3 | 0.5M $NH_4F$ | 0.03* | 6.8 | 3.1 | ≤1.0 |
|   | 0.5M HCl | 0.25 | 9.0 | 3.5 | ≤1.0 |
|   |   | 1.0 | 10.6 | 3.8 | ≤1.0 |
|   |   | 3.0 | 11.2 | 3.9 | ≤1.0 |
|   |   | 5.5 | 11.0 | 3.8 | ≤1.0 |
|   |   | 22.5 | 11.3 | 3.1 | 1.2 |
|   |   | 96.0 | 12.1 | 2.6 | 1.5 |
| 4 | 0.1M $NH_4F$ | 0.03* | 1.5 | 0.8 | 1.3 |
|   | 0.1M HCl | 0.5 | 1.7 | 0.7 | 1.3 |
|   |   | 2.0 | 2.1 | 0.7 | 1.3 |
|   |   | 6.0 | 2.5 | 0.9 | 1.6 |
|   |   | 25.0 |  | 1.0 | 1.7 |
| 5 | 1.0M $NH_4F$ | 0.03* | 3.2 | 1.1 | 5.0 |
|   | 0.1M HCl | 0.25 | 3.4 | 0.9 | 5.2 |
|   |   | 1.0 | 3.6 | 0.9 | 6.0 |
|   |   | 1.75 | 3.8 | 1.0 | 6.6 |
|   |   | 3.0 | 3.8 | 1.0 | 6.8 |
|   |   | 94.0 | 3.9 | 1.1 | 7.0 |

*Sampled as quickly as possible after mixing of system.

A conventional mud acid is fairly well modeled by the 1 M ammonia fluoride 2 M hydrochloric acid system of test 2. The pH remained at probably less than 1 (below the limit of sensitivity of the meter) throughout a 4 day period. But, almost one-half of the total clay temperature for the desired time period, chilled to room temperature, and then sampled. In this manner the evaporation of methyl formate was held to a 14 percent loss. The test data is listed in table 2.

Table 2

TEST 6:
DATA FOR RUN AT 70°C (158°F), INITIAL SOLUTION WAS 0.94 M IN NH₄F AND 1.85 M IN METHYL FORMATE

| Elapsed Time (hrs) | Net Bentonite Dissolved (Gravimetric) (ppm) | Net Bentonite Dissolved (Silica Analysis) (ppm) | Total Hydrolyzed Acid* (m/l) | Total Unhydrolyzed Ester (m/l) | Total HF as F (ppm) | Total Bentonite "Reacted" (ppm) | Maximum Possible Reprecipitation "Ralstonite" (ppm) | (%**) |
|---|---|---|---|---|---|---|---|---|
| 0.0 | 2,500. | 258. | 0.03 | 1.57 | 570. | 516. | 258. | 50. |
| 0.5 | 4,100. | 2,546. | 0.22 | 1.38 | 4,180. | 3,787. | 1,241. | 33. |
| 1.0 | 7,300. | 5,212. | 0.48 | 1.12 | 9,120. | 8,263. | 3,051. | 37. |
| 1.5 | 9,500. | 7,207. | 0.59 | 1.01 | 11,210. | 10,156. | 2,949. | 29. |
| 2.5 | 11,200. | 9,185. | 0.81 | 0.79 | 15,390. | 13,943. | 4,758. | 34. |
| 3.5 | 13,100. | 9,838. | 1.11 | 0.49 | 17,860. | 16,181. | 6,313. | 39. |
| 4.5 | 12,700. | 10,337. | 1.28 | 0.32 | 17,860. | 16,181. | 5,844. | 36. |
| 5.5 | 12,500. | 10,303. | 1.44 | 0.16 | 17,860. | 16,181. | 5,878. | 36. |
| 6.5 | 12,000. | 10,372. | 1.49 | 0.11 | 17,860. | 16,181. | 5,809. | 36. |
| 10.25 | 12,100. | 10,870. | 1.58 | 0.02 | 17,860. | 16,181. | 5,311. | 33. |
| 22.0 | 11,900. | 10,888. | 1.60 | 0.00 | 17,860. | 16,181. | 5,293. | 33. |
| 1 | 2 | 3 | 4 | 5 | 6 | 7 | 8 | 9 |

*Referred to final total acid as total formate throughout run (1.60 m/l).
**Referred to total bentonite "reacted".

Column 2 of table 2 lists a gravimetric determination of the amount of net bentonite dissolved. Column 3 lists similar measurements by a colorimetric anaylsis for the amount of silica in filtered portions of the solution. It is apparent that there is not a 1 to 1 correspondence between gravimetrically determined clay solution level and silicate contents as determined colorimetrically.

After 4.5 hours of reaction time the solution process is substantially complete. The gravimetric results level off at about 12,400 parts per million (12.4 grams per liter) bentonite dissolved, as determined gravimetrically, or 10,500 parts per millon by colorimetric determination. The consistent difference in the measurements suggests that some constituent of the clay other than bentonite itself was dissolved early in the process.

Column 4 is the total hydrolyzed acid measured by titration with sodium hydroxide with the amount of base required for the ammonium ion being substracted from the total amount required. Column 5 lists measurements of the total unhydrolyzed ester obtained by subtracting the column 4 values from 1.60 moles per liter. The final value for the total acid was assumed to be about 1.6 molar for each acid. Since the final concentration of formic acid was 1.60 molar, and the evaporation loss of methyl formate was 13.5 percent, the subtracting procedure provided an approximate method of correcting for evaporation loss.

One sample of the filtered-off residue from a clay dissolution test was examined by X-ray diffraction and found to be 60 percent bentonite and 40 percent ralstonite based on the crystalline portion of the sample. The formula of ralstonite is $(NA_2Mg)F_2 \cdot 3Al(F,OH)_3 \cdot 2-H_2O$. Its fluorine content established that some of hydrofluoric acid developed by this system has precipitated along with a reprecipitation of some bentonite-derived material. The maximum value for the amount of such crystalline ralstonite deposited from this sample was obtained by multiplying the concentration of residual solids in the final solution by 0.40. This yielded a value of 5,100 ppm for the ralstonite precipitation.

Note that the values in column 8 of table 2, were obtained by subtracting corresponding entries in column 3 from those in column 7. This approximates the 5,100 ppm value obtained by X-ray measurement.

It appears that about one third of the total dissolved bentonite reprecipitated as ralstonite. The ralstonite formation may be a characteristic behavior of the present relatively weak acid-effected dissolving of siliceous materials.

We have found that ralstonite is readily soluble in a relatively dilute hydrochloric acid solution which is substantially free of hydrofluoric acid (e.g., about a 10 percent, or more dilute, aqueous hydrochloric acid). This suggests a particularly suitable well acidization process comprising injecting a preflush slug of hydrochloric acid (about 500 gallons) ahead of a slug (such as 1,000 gallons) of the present self-acidizing liquid into a moderately thick reservoir interval (such as a 15 ft. interval) of a primarily siliceous formation in which the hydrochloric acid is not completely spent. After injecting both slugs and allowing them to react, fluids are backflowed into the well. During the backflow the region contacted by the present relatively high pH hydrofluoric acid solution will be swept by the back-flowing relatively dilute hydrochloric acids. Thus, at least some precipitated ralstonite will be dissolved. This is particularly advantageous because such a dissolution of the ralstonite by the hydrochloric acid releases the hydrofluoric acid which will then be free to dissolve in the order of 60 percent of the siliceous material it encounters as it is flowing back toward the well.

A particularly suitable formulation and procedure for treating a well is exemplified by the following: Assume that a well has about a 15 ft. interval opening into a reservoir sand having a temperature of about 170° F and a bottom-hole pressure of about 3,000 psi, and is equipped with tubing adapted to contain about 0.0039 barrels per linear ft. Assume that fluid can be injected into the reservoir at about 0.25 barrels per minute providing a velocity of about 65 ft., per minute within the tubing and a flow time in the tubing of about 2 hours. A suitable self-acidifying liquid system comprises (per each 48.8 gallons of total liquid): 41.6 gallons water, 5.22 gallons methyl formate, 10.1 pound ammonium bifluoride and 1.36 gallon, 29.4 percent aqueous ammonium hydroxide.

In a preferred mixing procedure the water is added to a tank to which ammonium bifluoride is than added and dissolved. The ammonium hydroxide is subsequently added and dissolved. This mixture of the reactants can be allowed to stand for an indefinite time. Immediately before pumping the methyl formate is added and dissolved.

Corrosion inhibitors can advantageously be mixed with the present liquid systems and any compatible acid pre-flush or after flush liquids can be used. Examples of generally suitable corrosion inhibitors include ammonium compounds such as thio-ureas, quaternary ammonium salts, heterocyclic nitrogren compounds, rosin amines and the like, inorganic compounds such as arsenic derivatives, unsaturated materials such as acetylenic alcohols, those available as MSA Inhibitors from Halliburton, E-878 Inhibitors from Dowell, and the like. Other additives such as reducing agents, etc., can be used as long as they do not interfere with the generation of or reactions of the present clay-dissolving solution of acids.

WELL TREATMENT EXAMPLE 1

A field test of this process was conducted in a well whose producing zone was 10 ft. thick at a depth of about 7,800 ft. The following solutions were ejected into the well down the regular production tubing at a rate of about 0.25 barrel per minute.

1. 300 gallons of xylene
2. 500 gallons of 10 percent hydrochloric acid, also containing 7 lbs. of citric acid and a normal amount of conventional corrosion inhibitor.
3. A solution composed of the following:
   852 gallons of fresh water
   207 pounds of ammonium bifluoride
   28 gallons of 30 percent aqueous ammonia solution
   107 gallons of methyl formate This solutions was mixed immediately before pumping and contained 0.5 percent of Dowell E-878 corrosion inhibitor.

4. Enough diesel oil was then pumped in to fill the tubing and well. This forced all of the main treating solution (3. above) into the formation.

The well was shut in for 6 hours to allow complete hydrolysis of the methyl formate at the formation temperature (about 160° F).

The well was returned to production very slowly on gas lift. Immediately before treatment the daily production of the well was 17 bbls. of oil and 55 bbls. of water. Eighteen days after the treatment the daily production had increased to 30 bbls. of oil and 102 bbls. of water.

WELL TREATMENT EXAMPLE 2

A well in which the reservoir temperature is about 280°F, is treated in accordance with the present invention by injecting fluids of the following type and composition. The term "pore volume" refers to the volume of fluid-filled space in the volume of reservoir to be treated.

1. A solvent preflush comprising 0.4 pore volume xylene.
2. An acid preflush comprising 0.3 pore volume of 10 percent aqueous HCl (preferably containing an iron chelating material and a corrosion inhibitor).
3. A skin-removing mud acid preflush (for dissolving clay immediately adjacent to the borehole) comprising 1.0 pore volume of an aqueous solution containing 7½ percent HCl and 1½ percent HF.
4. A mud acid overflush comprising 0.2 pore volume of 10 percent aqueous HCl.
5. A buffer slug comprising 0.8 pore volume of a 3 percent aqueous solution of ammonium chloride.
6. A self-acidifying aqueous liquid slug comprising 1.0 pore volume of a homogenous liquid emulsion containing:
   enough 1 molar aqueous ammonium bifluoride to provide 1 mole of ammonium fluoride per liter of emulsion
   1.0 moles/liter of emulsion of 30 percent aqueous ammonia solution
   2.0 moles/liter of emulsion of allyl chloride
   4 percent by volume of emulsion of Triton GR-7 surfactant The well can then be shut in for a time, such as about 24 hours, sufficient to complete the hydrolysis of the organic halide, and then produced.

WELL TREATMENT EXAMPLE 3

Alternatively, in a similarly conducted well treatment, where the reservoir temperature is 100° F, the fluids injected are those described in well treatment Example 2, with the exception that the self-acidifying aqueous liquid slug comprises 10 pore volume of a homogeneous liquid emulsion containing:
enough 1 molar aqueous ammonium bifluoride to provide 1 mole of ammonium fluoride per liter of emulsion
1.0 moles/liter of emulsion of 30 percent aqueous ammonia solution
2.0 moles/liter of benzoyl chloride
4.0 percent by volume of emulsion of GR-7 surfactant

WELL TREATMENT EXAMPLE 4

Alternatively, in a similarly conducted well treatment, where the reservoir temperature is 80° F, the fluids injected can be those described in well treatment Example 2 with the exception that the self-acidifying aqueous liquid slug comprises 1.0 pore volume of an emulsion containing:
enough 1 molar aqueous ammonium bifluoride to provide 1 mole of ammonium fluoride per liter of emulsion
1.0 mole/liter of emulsion of 30 percent ammonia solution
2.0 mole/liter of acetic anhydride
4.0 percent by volume of emulsion of GR-7 surfactant

LABORATORY TEST 8

Table 3 shows the results of comparative tests of the solubility of four typical oil field cements in a typical formulation of the present self-acidifying aqueous liquid system. The cements used were, respectively: API Class H oilwell cement; and API Class H oilwell cement plus, respectively, 4 and 8 percent (by weight) gel (sodium Montmorillonite); and API lightweight oil well cement. The self-acidifying liquid system (SGMA for Self-Generating Mud Acid) consisted of an aqueous solution containing 2 moles methyl formate, 2 moles formic acid, and 1 mole of ammonium fluoride per liter.

As indicated in the table, very little cement was dissolved during the 30-hour test at 158° F contact with the SGMA solutions. In contrast the average percent dissolved by the conventional mud acid was 27 percent.

TABLE 3

LABORATORY TEST 8
RESULTS OF CONTACT OF CEMENT WITH FLUIDS AT 158° F FOR 30 HOURS

| Cement Sample | Fluid | Compressive Strength (psi) | Percent Dissolved | Percent Change in Compressive Strength |
|---|---|---|---|---|
| Class H | $H_2O$ | — | 0 | 0 |
| Class H | $H_2O$ | 3300 | 0 | |
| Class H | *SGMA | 2400 | −1.4 | −15 |
| Class H | SGMA | 3200 | −1.5 | |
| Class H | *HCl/HF | 3200 | 16.7 | +3 |
| Class H | HCl/HF | 3600 | 20.3 | |
| Class H + 4 percent gel | $H_2O$ | 1340 | 0 | 0 |
| Class H + 4 percent gel | $H_2O$ | 1750 | 0 | |
| Class H + 4 percent gel | SGMA | 1600 | 1.9 | +4 |
| Class H + 4 percent gel | SGMA | 1600 | 4.8 | |
| Class H + 4 percent gel | HCl/HF | 2000 | 17.3 | +42 |
| Class H + 4 percent gel | HCl/HF | 2400 | 26.1 | |
| Class H + 8 percent gel | $H_2O$ | 1730 | 0 | 0 |
| Class H + 8 percent gel | $H_2O$ | 1160 | 0 | |
| Class H + 8 percent gel | SGMA | 1050 | 0.8 | −29 |
| Class H + 8 percent gel | SGMA | 1000 | 2.3 | |
| Class H + 8 percent gel | HCl/HF | 1070 | 29.4 | −43 |
| Class H + 8 percent gel | HCl/HF | 590 | 35.8 | |
| Lightweight | $H_2O$ | 2200 | 0 | 0 |
| Lightweight | $H_2O$ | 3000 | 0 | |
| Lightweight | SGMA | 1800 | 3.9 | −32 |
| Lightweight | SGMA | 1750 | 3.5 | |
| Lightweight | HCl/HF | 1010 | 30.0 | −51 |
| Lightweight | HCl/HF | 1530 | 43.6 | |

*SGMA - two M methyl formate
two M formic acid
one M $NH_4F$

HCl/HF  two M HCl
one M $NH_4F$

What is claimed is:

1. A process for dissolving a siliceous material in a remote location into which a fluid can be flowed, which process comprises:
   mixing at least one aqueous liquid, at least one water-soluble fluoride salt, and at least one water-reactive organic acid ester, to form a substantially homogeneous liquid system containing components that interact to yield an aqueous solution that contains hydrofluoric acid and at least one organic acid, has a pH of at least about 2, and is capable of dissolving bentonite;
   flowing said liquid system into contact with the siliceous material to be dissolved; and
   adjusting the composition of said liquid system and the rate of said flowing of it so that the siliceous material is contacted by the system while at least some of said acids are present in the system.

2. The process of claim 1 in which the siliceous material to be dissolved is located in or around the borehole of a well.

3. The process of claim 2 in which a slug of an aqueous acid that is substantially free of hydrofluoric acid and is adapted to dissolve multivalent metal carbonates is flowed into the well ahead of said liquid mixture.

4. The process of claim 2 in which a relatively dilute aqueous acid that is substantially free of hydrofluoric acid and is capable of dissolving ralstonite is flowed into the well behind said liquid system.

5. The process of claim 2 in which:
   a slug of aqueous acid that is substantially free of hydrofluoric acid and is adapted to dissolve both calcium carbonate and ralstonite is injected ahead of said liquid system in a volume sufficient to dissolve carbonates encountered in the reservoir and leave substantially unspent acid; and
   after injecting said liquid system into the reservoir and allowing it to react, fluid is backflowed from the reservoir until at least a portion of a region contacted by the liquid system is swept by backflowing, unreacted portions of said first-injected slug of acid.

6. The process of claim 2 in which said liquid system is flowed into contact with siliceous material by positioning a slug of said liquid system in a casing, perforating the casing, and displacing liquid through at least one perforation and into a subterranean reservoir.

7. The process of claim 2 in which said liquid system is thickened by the addition of an aqueous thickening agent and the thickened liquid system is utilized as a carrier liquid for a pack-forming slurry of sand or gravel from which the carrier liquid is subsequently displaced into earth formations around the well.

8. The process of claim 1 in which the water-reactive organic ester is an ester of a water-soluble fatty acid.

9. The process of claim 8 in which said ester is a water-soluble alcohol ester.

10. The process of claim 1 in which the water-reactive organic acid ester is methyl formate.

11. The process of claim 1 in which the fluoride salt is ammonium salt of hydrofluoric acid.

12. The process of claim 1 in which:
   the location of the siliceous material to be dissolved is such that fluid being flowed nto contact with it must pass through a structure or region that is susceptible to attack by acid; and
   the composition of said liquid system and the rate of said flowing of it are adjusted so that said liquid system is substantially neutral while it passes through said region of acid susceptibility.

13. The process of claim 1 in which said aqueous liquid is water at least substantially as pure as fresh water, said fluoride salt is an ammonium salt of hydrofluoric acid and said ester is methyl formate.

14. A process for dissolving a siliceous material in a remote location into which a fluid can be flowed which process comprises:
mixing (a) at least one aqueous liquid (b) at least one water-soluble fluoride salt and (c) at least on relatively slowly reactive acid-yielding material that yields an acid adapted to convert an aqueous solution of said fluoride salt to an aqueous solution of hydrofluoric acid, to form a substantially homogeneous system in which the components interact to provide an aqueous solution that contains enough hydrofluoric acid to dissolve bentonite while having a pH of at least about 2;
flowing said liquid system into contact with siliceous material to be dissolved; and
adjusting the composition of said liquid system and the rate of flowing it so that the siliceous material is contacted by the system while the bentonite-dissolving proportion of hydrofluoric acid is present in the aqueous solution.

15. The process of claim 14 in which the siliceous material to be dissolved is located in or around the borehole of a well.

16. The process of claim 14 in which the composition of said liquid system and the rate of flowing it are adjusted so that unreacted water-soluble fluoride salt remains in the aqueous solution while the solution is in a region in which it is desired to maintain a relatively high pH.

17. The process of claim 14 in which the acid-yielding material is an ester of a water-soluble fatty acid.

18. The process of claim 14 in which the acid-yielding material is a hydrolyzable organic halide.

19. The process of claim 14 in which the acid-yielding material is an acyl halide.

20. The process of claim 14 in which the acid-yielding material is an acid anhydride.

* * * * *